United States Patent
Harrington

(10) Patent No.: US 7,764,400 B2
(45) Date of Patent: Jul. 27, 2010

(54) HARD COPY OUT OF GAMUT DETECTION

(75) Inventor: Patrick R. Harrington, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 688 days.

(21) Appl. No.: 11/712,094

(22) Filed: Feb. 28, 2007

(65) Prior Publication Data
US 2008/0204829 A1    Aug. 28, 2008

(51) Int. Cl.
*H04N 1/40* (2006.01)
(52) U.S. Cl. .................... 358/1.9; 358/2.1; 358/504
(58) Field of Classification Search .............. 358/1.9, 358/2.1, 527, 530, 504, 1.13; 382/166–167
See application file for complete search history.

(56) References Cited

U.S. PATENT DOCUMENTS

| | | | |
|---|---|---|---|
| 5,270,808 A | 12/1993 | Tanioka | |
| 5,903,275 A | 5/1999 | Guay | |
| 6,556,300 B2 | 4/2003 | Tandon et al. | |
| 6,567,170 B2 | 5/2003 | Tandon et al. | |
| 6,621,576 B2 | 9/2003 | Tandon et al. | |
| 6,975,949 B2 | 12/2005 | Mestha et al. | |
| 7,061,503 B2 | 6/2006 | Newman | |
| 7,085,004 B2 | 8/2006 | Sharma et al. | |
| 7,327,384 B2 * | 2/2008 | Ivers | 348/184 |
| 2004/0001072 A1 | 1/2004 | Newman | |
| 2004/0257596 A1 | 12/2004 | Mestha et al. | |
| 2005/0036159 A1 | 2/2005 | Sharma et al. | |
| 2005/0036171 A1 | 2/2005 | Bala et al. | |
| 2005/0152597 A1 | 7/2005 | Spaulding et al. | |
| 2007/0008557 A1 | 1/2007 | Harrington et al. | |

OTHER PUBLICATIONS

Adobe Systems, Inc., *Adobe Photoshop 5.0 User Guide*, Chapter 6, Making Color and Tonal Adjustments, XP-002529107, pp. 110-111, Jan. 1, 1998.
www.gamutvision.com/docs/gamutvision_equations.html.
*Advanced Color Ensembles*, X-RITE, L11-145, Jan. 2005.
U.S. Appl. No. 11/170,638, filed Jun. 30, 2005, Wu et al.
U.S. Appl. No. 11/635,741, filed Dec. 7, 2006, Minhas et al.

* cited by examiner

*Primary Examiner*—Thomas D Lee
*Assistant Examiner*—Stephen M Brinich
(74) *Attorney, Agent, or Firm*—Fay Sharpe LLP

(57) ABSTRACT

A method for representing out of gamut colors in a original printed image for an output device includes sampling the original printed image to identify colors for the original image, comparing the identified colors of the sampled original printed image with an output profile of an output device to identify out of gamut colors for the output device, and displaying a preview of the original printed image in which out of gamut colors for the output device are identified.

22 Claims, 4 Drawing Sheets

US 7,764,400 B2

HARD COPY OUT OF GAMUT DETECTION

CROSS REFERENCE TO RELATED PATENTS AND APPLICATIONS

The following references, the disclosures of which are incorporated herein in their entireties by reference, are mentioned:

U.S. application Ser. No. 11/170,638, filed Jun. 30, 2005, entitled AUTOMATED IMAGE QUALITY DIAGNOSTICS SYSTEM, by Wencheng Wu, et al.

U.S. application Ser. No. 11/635,741, filed Dec. 7, 2006, entitled PRINTER JOB VISUALIZATION, by Rajinderjeet Minhas.

BACKGROUND

The present exemplary embodiment relates generally to the printing arts. It finds particular application in conjunction with an apparatus and a method for identifying colors which are outside the color gamut available with a printing system. However, it is to be appreciated that the present exemplary embodiment is also amenable to other like applications.

The range of colors, or gamut, as perceived by the human eye, captured on film, displayed on a computer monitor, or rendered by a printer varies significantly. Each has its own color space, a mathematical means of describing the colors which it can capture. L*, a*, b*, for example, are the independent space representations of the CIE (Commission Internationale de L'eclairage) for color standards which are often utilized in the functional modeling of these color demands. L* defines lightness, a* corresponds to the red/green value and b* denotes the amount of yellow/blue. RGB is an additive color space that combines red, green and blue light to create all other colors. RGB color spaces are used by monitors, digital cameras, and scanners. CMYK color, on the other hand, is a subtractive color space using cyan, magenta, yellow and black inks on paper to absorb red, green and blue light. The remaining reflected light is the color perceived by the viewer. Typically, the halftone density of a colorant to be used in rendering an image is specified by an 8 bit integer (a whole number between 0 and 255 in base 10 notation). The number 255 corresponds to the maximum density which can be achieved. A tone reproduction curve is used to determine which combination of available colorants (typically cyan, magenta, yellow, and black) will yield the desired colors specified.

While most color display monitors can display hundreds of thousands of colors using gray scale or continuous tones (contone), color marking devices, such as printers and copiers, usually have a significantly smaller number of producible colors. In halftone printing, for example, the image is made up of an array of pixels. The chromaticity of a given area is increased by turning on an increasing number of pixels of the colorant. The maximum density of a colorant is achieved, for a given area, when 100% of the pixels are turned on. A pixel is the smallest element of a printing system that can be independently controlled. Different printing devices have different color gamuts which are described in terms of the printer's output profile.

Customers often wish to make color copies using one printer, of hard copy documents which have been printed on another printer. For example, a customer may wish to make copies of an offset proof on a xerographic printer. One way to achieve a good match on a digital printer is to iterate through all the possible CMYK emulation modes on the printer's digital front end (DFE) and fine tune the color with custom Tone Reproduction Curves (TRCs). One problem with this approach is that there are often certain out of gamut colors, which are impossible for the printer to obtain. It may not be until some considerable trial and error with custom TRCs has been undertaken that a customer realizes that a color is out of their device's gamut and therefore unachievable. This can be frustrating for a customer since in addition to wastage of time, materials are consumed during the printing of test pages.

INCORPORATION BY REFERENCE

The following references, the disclosures of which are incorporated herein in their entireties, are mentioned.

U.S. Pub. No. 20070008557, entitled METHOD FOR REMOTE PROOFING OF DFE COLOR ARCHITECTURE, published Jan. 11, 2007, by Harrington, et al., discloses a method for remote proofing a digital press by performing the color rendering of a specific DFE and printer, including taking into account job and printer settings, while maintaining vector objects.

U.S. Pat. No. 6,975,949, issued Dec. 13, 2005, entitled FULL WIDTH ARRAY SCANNING SPECTROPHOTOMETER, by Mestha, et al. discloses a full width array spectrophotometer for full width scanning color analysis of color test targets. The spectrophotometer includes one or two substantially linear elongated arrays of closely spaced multiple LED illumination sources of plural different color emissions in a multiply repeated pattern of at least three or four different colors transversely spanning a printer paper path and sequentially illuminated to illuminate a transverse band across a printed sheet moving in the paper path.

U.S. Pub. No. 20050036171, published Feb. 17, 2005, entitled SYSTEM AND METHOD FOR SELECTING THE BEST SET OF DEVICES FOR RENDERING COLOR DOCUMENTS, by Bala, et al., discloses a system for selecting a best device for rendering a color document which involves first determining the types of color data included in the color document to be printed. Once the type of color data has been determined, the color characteristics are matched against the strengths of the available output devices to obtain a list of devices best suited for this particular color print job.

BRIEF DESCRIPTION

In accordance with one aspect of the exemplary embodiment, a method for representing out of gamut colors in an original printed image for an output device is provided. The method includes sampling the original printed image to identify colors for the original image. The identified colors of the sampled original printed image are compared with an output profile of an output device to identify out of gamut colors for the output device. A preview of the original printed image is displayed in which out of gamut colors for the output device are identified.

In another aspect, a user interface for an application program displays a preview of an original hardcopy document, the user interface identifying colors of the original document which are out of gamut for a selected output device.

In another aspect, a system includes an optical sensor which samples an original printed image to identify colors for the original image. An image processor compares the identified colors of the sampled original image with an output profile of an output device to identify colors of the original image which are out of gamut colors for the output device. A user interface displays a preview of the original printed image in which the out of gamut colors for the output device are identified.

DETAILED DESCRIPTION

Aspects of the exemplary embodiment relate to an apparatus and to a method for identifying colors in an original printed image, such as a hardcopy proof, which are out of gamut colors for an output device. The exemplary system and method find application in the identification of an appropriate emulation mode of an available output device for rendering a copy of the original printed image which most closely matches the colors of the original printed image.

Figure 1:
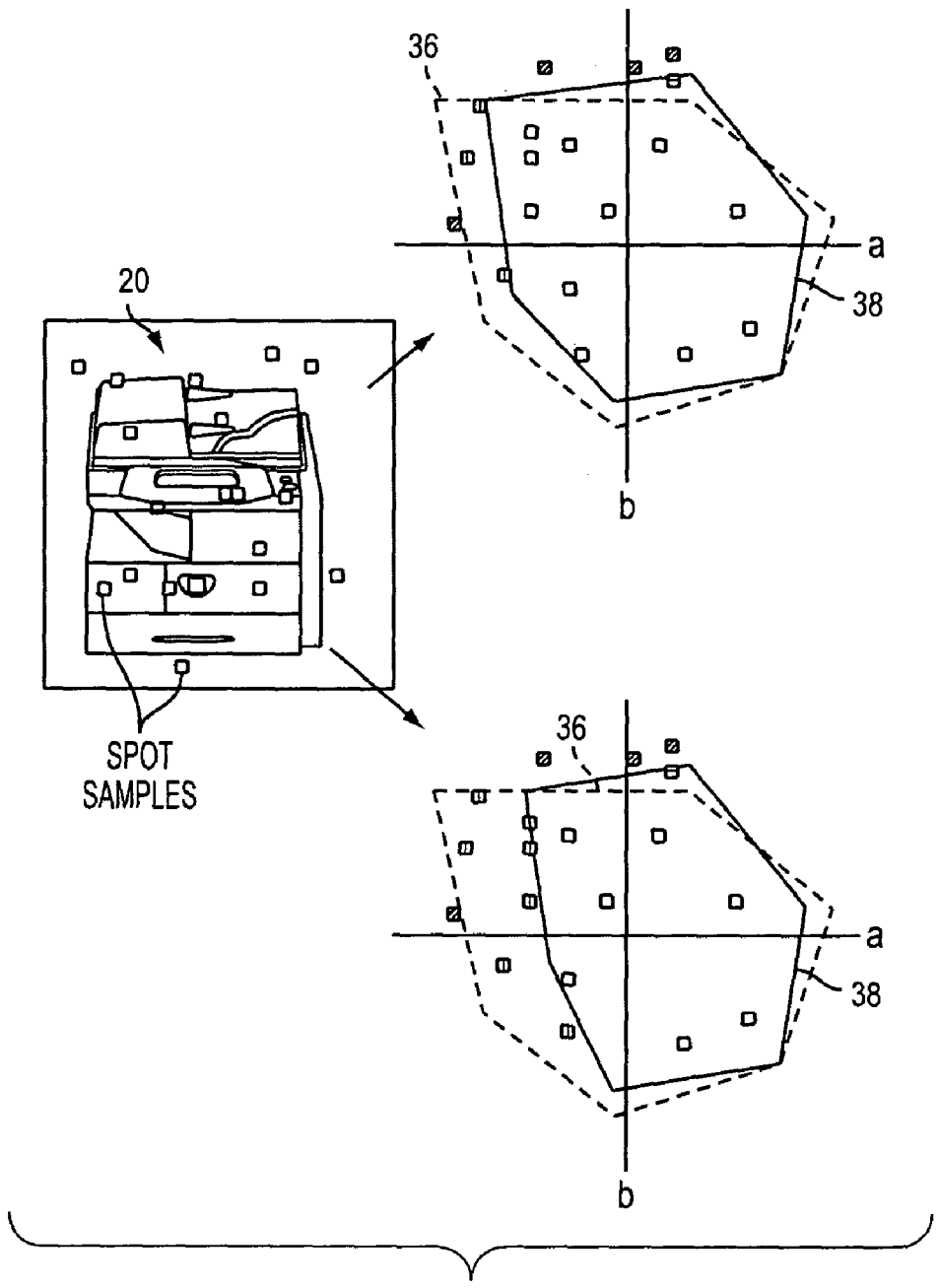
FIG. 1 is a schematic view of cross sections of two source profiles represented in a device independent color space, L*, a*, b* color space, as viewed through the L* axis, which may be used by a printer, and the relationship between these profiles and the output profile of the printer, indicating colors of a hardcopy proof which are out of gamut for one or both of the source and output profiles.

With reference to FIG. 1, an output device, such as a printer, has a finite set of colors which it can print. The "output profile" characterizes the possible colors of a given output device (as will be appreciated, FIG. 1 shows only a two dimensional representation of a portion of the volume represented by the output profile). Colors which cannot be reproduced with a predetermined accuracy, i.e., those outside the output profile, are considered to be out of gamut for the output device. The set of colors in the output profile is a function of the colorants available in the output device as well as on the level of coverage of the substrate which can be achieved. The output device may further be provided with one or more emulation modes. Each emulation mode provides a mapping between color values of the colors of an input image and corresponding color values for the particular emulation mode. The set of colors in a particular emulation mode constitute the "emulation space" or source profile. The source profile approximates output color values for those input colors which are out of gamut for the particular emulation mode, e.g., by substituting a color with less intense hue. Each emulation mode, where more than one mode is available, applies slightly different algorithms for matching input colors to colors within its source profile. Because the different emulation modes have different color gamuts, a color which is out of gamut for purposes of one emulation mode may be within gamut for another emulation mode. Exemplary emulation modes include SWOP (Specifications for Web Offset Publications), FOGRA, GRACOL, ISOCoated, Euroscale, Japan CMYK, and the like. While the colors provided by the source profile of the particular emulation mode generally fall within the printer's output profile, as illustrated in FIG. 1, a portion of the colors may be outside the printer's output profile. Thus, only those colors which fall within the volume represented by the intersection of the selected emulation mode and the output profile of the printer (those colors represented by the unfilled squares in FIG. 1) are accurately rendered. Other colors may be considered out of gamut for the printer in the particular emulation mode selected.

In many instances, a customer wishes to make copies of an original image where the color space (output profile and/or source profile) of the printer which was used to render the original printed image is unknown. In various aspects, the exemplary apparatus and method allows the customer to view a preview of the original image on a graphical user interface in which the out of gamut colors, for a specific output device, are identifiable. This allows a customer to identify out of gamut colors for an unknown hardcopy proof before any print iterations are performed on a color output device.

Figure 2:
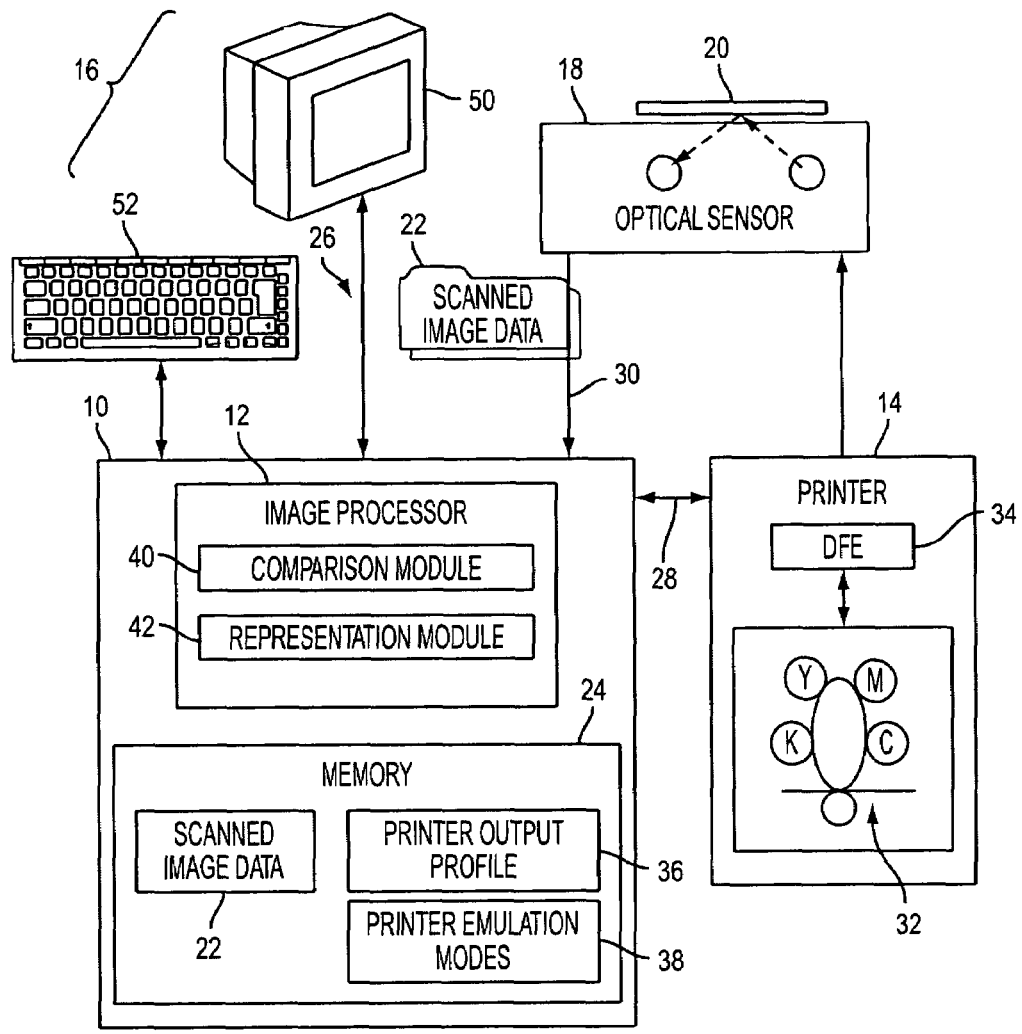
FIG. 2 is a functional block diagram of an environment in which an apparatus for identifying out of gamut colors in a hardcopy proof operates.

With reference to FIG. 2, a functional block diagram of an exemplary environment in which an apparatus 10 for identifying out of gamut colors may operate, is shown. The apparatus 10 includes an image processor 12 which runs an applications program for generating a preview of an input digital image. The preview is based on the output profile of a selected output device, here illustrated as a printer 14. The preview allows the user to identify colors of the original image which are out of gamut for the output device, i.e., which cannot be achieved with the selected output device and/or which are out of gamut for a particular emulation mode of the output device. The image processor 12 communicates with a graphical user interface (GUI) 16, whereby out of gamut colors can be identified to a user. A source of scanned image data, such as a digital optical sensor 18, scans a hardcopy proof 20 and generates image data 22 therefrom which is received by the apparatus 10. The image data 22 may be stored in an image data storage device or memory 24 during processing.

The GUI 16, printer 14, and optical sensor 18 are coupled with the apparatus 10 via data communication links 26, 28 and 30, respectively. The communication links 26, 28 and 30 may be any type of communication link that permits the transmission of data. For example, the communication links may be direct serial or parallel connections, a local area network (LAN), a wide area network (WAN), an intranet, the Internet, circuit wirings, combinations thereof, and the like.

The image output device 14 can be any type of device that is capable of outputting an image. For example, the image output device may include a device for rendering the modified image on a substrate for bearing images, such as paper, or for displaying the image. Exemplary output devices include printers, such as laser printers, bubble jet printers, ink jet printers, photocopying machines, multifunction devices, bookmaking machines, and display screens of display devices, such as cathode ray tubes (CRT), computer monitors, televisions, cameras, portable digital display devices, combinations thereof, or any suitable device or system that is able to generate an image on a substrate or display an image using image data or data generated from the image data. While the exemplary output device is described in terms of a printer 14, it will be appreciated that other output devices are also contemplated.

The printer 14 may include one or more marking engines 32 under the control of a common control system 34. Each marking engine 32 can be a device for applying an image to print media. Print media can be a physical sheet of paper, plastic, cardboard, or other suitable physical print media substrate for images, whether precut or web fed. The control system 34, or digital front end (DFE) determines appropriate colorant values for each of the colorants available in the marking engine (here illustrated as the four typical colorants, cyan, magenta, yellow, and black CMYK), for rendering a digital image on the print media. The printer may include a variety of other components, such as finishers, paper feeders, and the like. A digital image generally may include information in electronic form which is to be rendered on the print media by the marking engine and may include text, graphics, pictures, and the like.

In a typical xerographic marking engine 32, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper. The fusing of the toner onto the paper is generally accomplished by applying heat to the toner with a heated roller and application of pressure.

While the printer 14 is described with particular reference to a xerographic (e.g., laser) printer in which the colorants generally comprise dry toners and the image is applied electrophotographically, it is also contemplated that the printer may employ liquid or solid inks or other colorants and that the printer may be an inkjet printing system, solid ink printing system, bubblejet printing system, or other image applying device.

The printer 14 has a first output profile 36, which characterizes the possible colors of that it can print. The set of colors in the output profile is a function of the colorants available in the marking engine as well as on the level of coverage of the substrate which can be achieved. The printer 14 may further have one or more emulation modes available to it. Each of the emulation modes has a source profile 38 which provides a mapping between color values of an input image and corresponding color values within the source profile color gamut. As will be appreciated, while FIG. 2 shows only a single printer 14, it is to be appreciated that two or more printers may be available for rendering a copy of the original. Each other printer or printers that are available in the environment may have a second or subsequent output profile which differs from the first output profile, e.g., have fewer or more colors that are within gamut. The other printer(s) may also have an available emulation mode or modes which may be the same or different from that of printer 14.

The image processor 12 may be configured for querying the control systems 34 associated with each of the printers in the environment to obtain the output profile 36 specific to the associated marking engine 32 and the source profiles 38 for the emulation mode(s) which the DFE has available in its conversion software. Alternatively, this information may be sourced from the manufacturer or elsewhere. The output profile 36 and emulation mode source profiles 38 for the printer 12 may be stored in memory accessible by image processor 12, such as memory 24.

The optical sensor 18 can any type of optical sensing device that detects light input and translates the light input into image data. In one embodiment, the optical sensor is a wide format scanning spectrophotometer. The spectrophotometer may be set to sample a given print size with a relatively high frequency. In the sampling process, the sensor takes measurements on spot samples of the image to obtain color data. The sampling is performed with sufficient frequency to provide at least a low resolution scanned image of the original in which the colors of the original proof can be identified. The sampling thus need not be at a frequency which would be required for obtaining all of the image data which would generally be required for printing. The color data may be output in, or subsequently converted to, a device independent color space, such as L*, a*, b* or X,Y,Z. An exemplary scanning spectrophotometer which may be used is an X-Rite DTP70 spectrophotometer. Other suitable spectrophotometers are described in U.S. Pat. Nos. 6,975,949; 6,621,576; 6,556,300, and 6,567,170, all to Tandon, et al., incorporated by reference in their entireties. For example, the optical sensor may include a scanning array of photosensitive sensors such as CCDs or photodiodes which are controlled to sense light reflected from an image bearing substrate. The optical sensor may include a single sensor or a plurality of sensors. The scanned image may be a series of pixel values (image data) denoting the color, intensity, and/or any other image property of the particular pixels that make up the image. The light may be provided by an illumination array of closely spaced multiple LED illumination sources of plural different color emissions. While a color scanner, such as an RGB scanner, may be used as the sensor 18, in general, such devices do not provide the accuracy that a spectrophotometer provides.

The image processor 12 may include various software modules for processing the image data 22 and identifying out of gamut colors for a particular printer. In the illustrated embodiment, the processor 12 includes a comparison module 40 for comparing colors of the image data of the scanned original image to the colors of the output profile of the printer 14 and determining which colors are out of gamut for the printer. The comparison module may be configured for determining, for each pixel (spot measurement) of the scanned original, whether the color is out of gamut and, if so, may determine a measure of the degree to which the color is out of gamut. The comparison module may alternatively or additionally be configured for determining whether the pixel color is out of gamut for a particular emulation mode of the printer.

Image processor 12 further includes a preview module 40 for generating a preview of the scanned image 22 which allows a user to identify out of gamut colors in the original image, for a selected printer, and optionally the extent to which the colors are out of gamut. For example, the preview may be created by associating each of a plurality of regions of an image with information derived from the comparison. Each region may be the size of an individual pixel or a group of pixels. As will be appreciated, the modules 40, 42 may be combined into a single processing component or distributed in two or more processing components.

The apparatus 10 may be embodied in a computing device, such as a general purpose computer, e.g., a desktop, laptop, palm device, or the like, or a dedicated computing device, for example, in the digital front end of the printer 14 or in the optical sensor 18, in a network server, or the like. The image processor 12 may be in the form of a plug-in software component or hardware component. In the illustrated embodiment, the image processor 12 executes instructions for performing the exemplary method described with reference to FIG. 3. These instructions may be stored in memory, such as memory 24.

The graphical user interface 16 may include a color monitor 50, such as a LCD screen, cathode ray tube, or the like, and a user input device 52, such as a keypad, keyboard, joystick, mouse, touch screen, or combination thereof through which a user may interact with the apparatus 10. In one embodiment, the GUI 16 may be incorporated into the printer 14. The color monitor 50 may be calibrated at intervals to provide an accurate representation of colors of an image. For example, the customer may use the user input device 52 to request the image processor to use the output profile of a specific printer and/or a specific emulation mode in representing the original image and/or to request that out of gamut regions be identified. An out of gamut alarm 54 (visual or sound) (FIG. 4) may specify which colors are completely outside the output profile, and/or which colors are outside other possible emulation modes on the DFE, such as SWOP, FOGRA, Japan CMYK, etc. For example, the alarm may be used to indicate which colors are not available in any available emulation mode for a particular printer.

The memory 24 provides the image data 22 to the image processor 12. The memory can be any type of device that is capable of receiving image data and supplying image data to the image processor 12. For example, the memory 24 may be embodied in a general purpose computer, a microprocessor, a scanner processor such as a RAM, a PROM, an EPROM, a FLASH-EPROM, or other memory chip or cartridge, a disk drive, a tape drive, a hard disk, zip drive, CD-ROM drive, DVD drive, or other optical medium, a network server, a print server, or any other suitable device or system that is able to receive and provide image data. For simplicity of the following, it will be assumed that the memory is embodied in a personal computer 10 which may also include the image processor 12.

Any combination of the elements of FIG. 2 may be integrated into a single device. For example, the optical sensor 18, the image processor 12, the memory 24, and the image output device 14 may be contained within a single device such as a digital copier, a computer with a built-in printer, or any other integrated device that is capable of outputting an image. Similarly, the optical sensor 18 and the image processor 12 may be integrated into a single device, such as in a scanner or the like. Alternatively, the image processor 12 and the optical sensor 18 may be combined into a separate integrated device attachable upstream of a stand-alone image output device 14. For example, the image processor 12 and the memory 24 may be an integrated device which interfaces with both the optical sensor 18 and one or more image output devices 14. The image processor 12 and the memory 24 may be incorporated into a programmed general purpose computer, a network print server that manages printer data for a plurality of the same or different printer devices, or the like. Furthermore, the image processor 12 may be implemented as software executing on the optical sensor 18, the image data storage device 24 or the image output device 14. Other configurations of the elements shown in FIG. 2 may be used.

Figure 3:
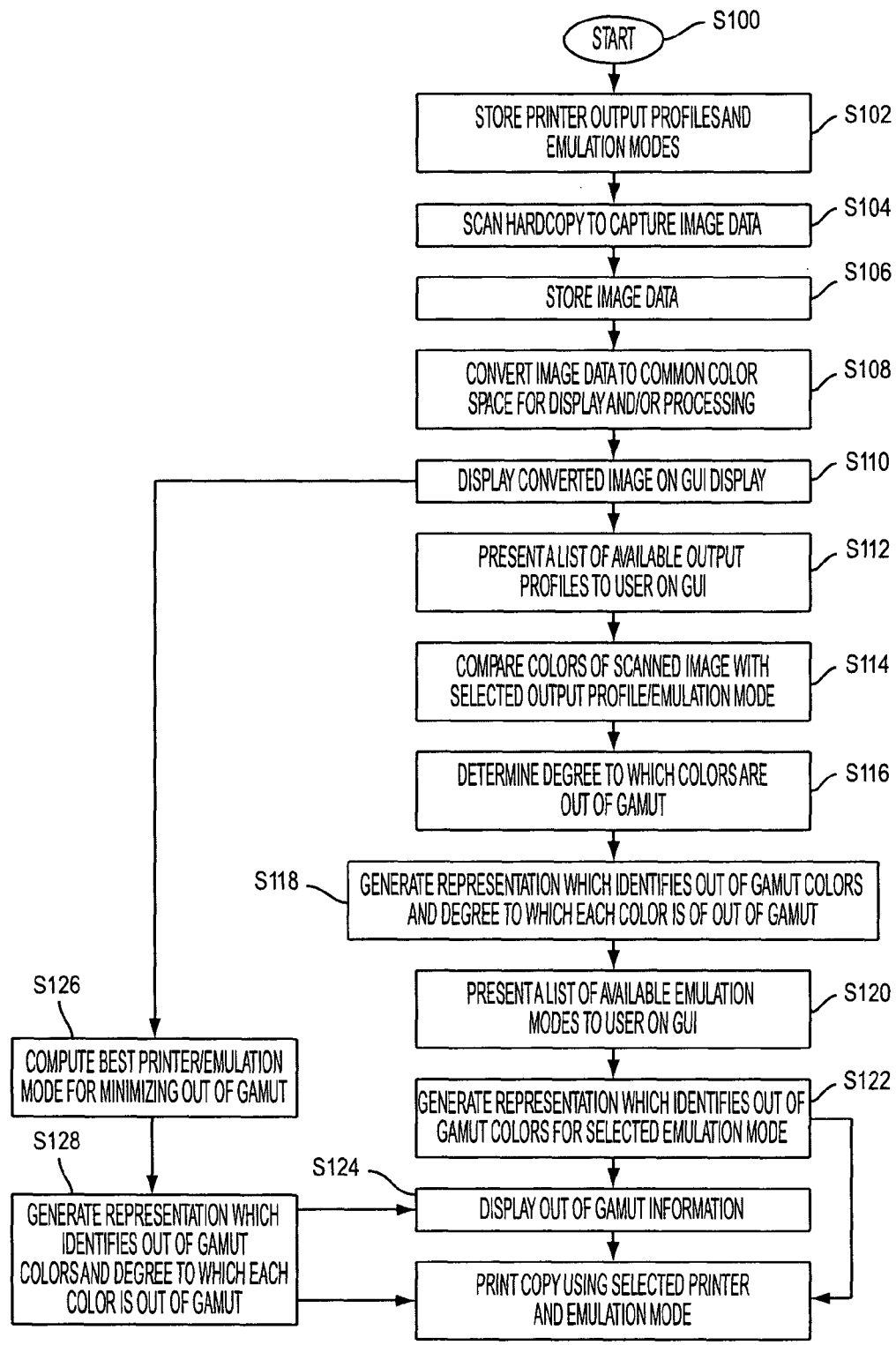
FIG. 3 is a flow chart showing an exemplary method for identifying out of gamut colors in a hardcopy proof.

With reference to FIG. 3, a method for identifying out of gamut colors in an original image is illustrated. The method may be performed in an environment such as that shown in FIG. 2. It will be appreciated that the method may include fewer, more, or different steps than those illustrated and that the steps need not be performed in the order illustrated. The method begins at S100, for example when a customer brings an original image which the customer would like to have printed on one of the available printers in a facility.

At S102, one or more output profiles 36 and/or source profiles 38 for an available printer or printers 14 are stored in memory 24 accessible to the processor 12. As will be appreciated, this step may be performed at any suitable time prior to a selected output profile/source profile being employed. The output profile, source profile(s), and image data are later compared in the same color space. Accordingly, the output profile and/or source profile(s) may be converted to the common color space, if necessary.

At S104, image data is captured, for example, by scanning the sheet of paper 20 on which the original image has been printed (a "proof"). For example, the optical sensor may acquire information which is converted to colorant values in a color space of the optical sensor, such as L*a*b* or XYZ values, for each of the sampled pixels, representing the colors of the original image. The spectrometer 18 may take fewer measurements than would be required for capturing the entire image. For example, the optical sensor 18 may make sufficient measurements to adequately sample the colors contained in the proof 20. The samples may be randomly spaced or obtained at a selected spacing. Orientation targets may be omitted.

At S106, the image data 22 is stored. For example a user selects, from a window in the GUI 16, a mode in which the scanned image 22 is to be evaluated by image processor 12. In this mode, the optical sensor 18 automatically sends the image 22 to memory 24, where it is stored in an appropriate storage location.

At S108, the sampled image data 22 may be converted by the image processor 12 to another color space, such as the color space of the monitor 50, e.g., RGB. If the optical sensor 18 is an RGB sensor, this step may be omitted. Various algorithms exist for conversion between color spaces.

At S110, the converted image data may be displayed as a low resolution image on the GUI.

At S112, where more than one printer is available, the output profiles of each of the printers may be displayed to the user in a window on the GUI. The output profiles may be identified in any convenient form, e.g., by printer name. The user may select an output profile from the plurality of the output profiles. Alternatively, the image processor 12 may automatically select an output profile, in which case this step may be omitted.

At step S114, the image data is compared with the selected one of the stored output profiles in memory 24 to identify colors which are out of gamut. This step may involve identifying colors which are out of gamut for the selected printer's output profile, i.e., which cannot be obtained on the printer, irrespective of the emulation mode employed. Alternatively, this step may involve identifying colors which are out of gamut for the printer in a specific emulation mode.

At S116, for each of the colors which are determined to be out of gamut, a measure of the degree to which the color is out of gamut may be determined. In one embodiment, matching is done by computing color distance. Color distance δE may be computed as Euclidean distance (square root of the sum of squares of the component differences) in the common color space. For example, if an input color is expressed in 8 bit notation in R,G,B as 254, 253, 1 and the nearest color within the printer profile is 230, 230, 1, the Euclidean distance is:

$$\delta E = \sqrt{(254-230)^2 + (253-230)^2 + (1-1)^2} = \sqrt{1105} = 33.24$$

Alternatively, the colors may be converted from the common space (RGB) to a visually uniform space such as CIE L*a*b*, and then the Euclidean distances between the out of gamut color and the nearest profile color computed in the visually uniform space.

In other embodiments, the determination of δE may be performed using a different function of the color values. For example, when computing the Euclidean distance in L*,a*, b*, the L* values may be ignored. Alternatively, δE may be computed to estimate more closely the perceived color difference, as outlined in the CIE-94 color difference formula $\delta E^*_{94}$.

Figure 4:
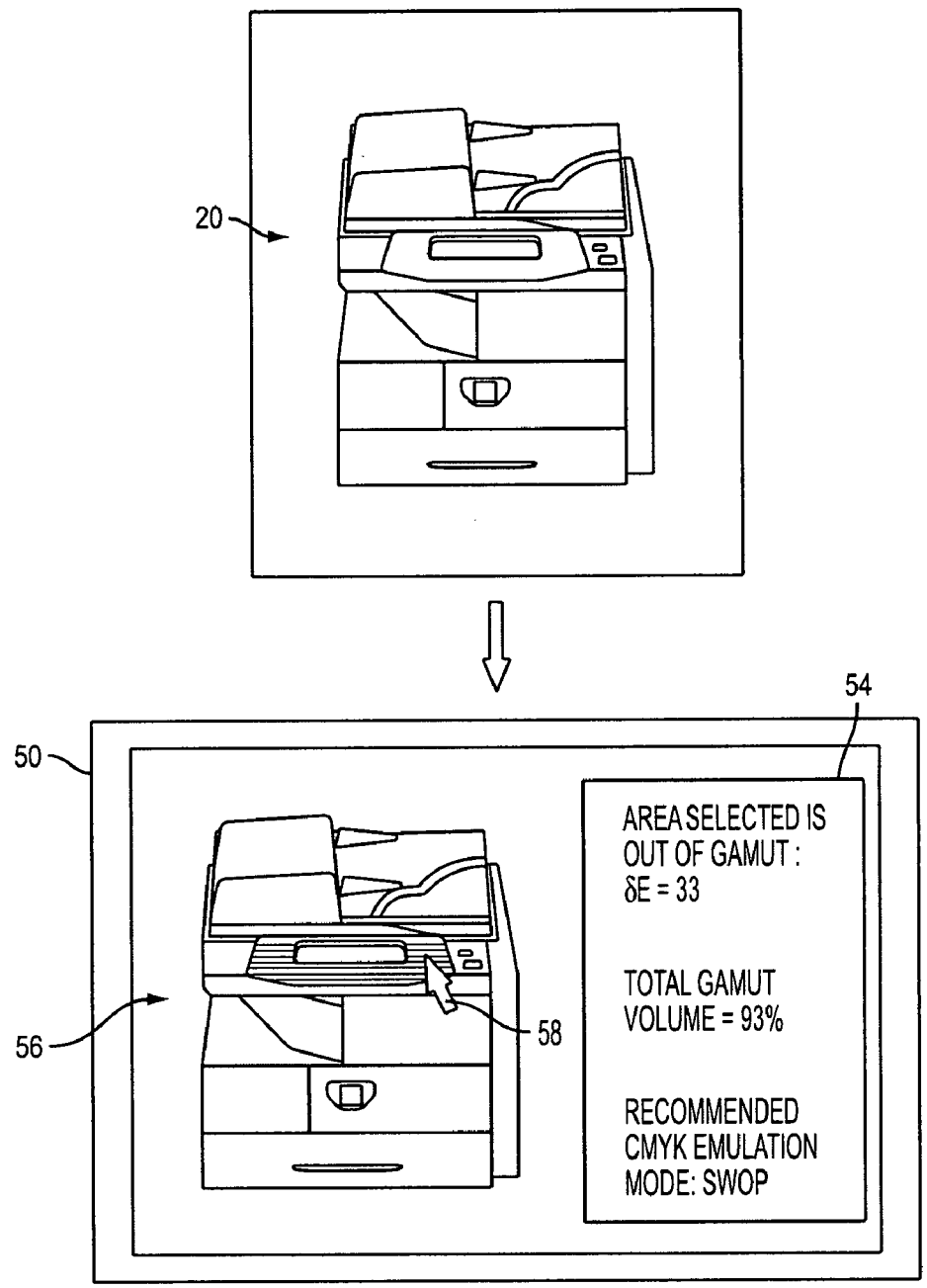
FIG. 4 graphically illustrates a preview of an original image being displayed on the user interface of FIG. 2.

At step S118, a preview of the original image, which identifies the out of gamut colors, is generated by processor 12 and may be made accessible to the user via the GUI. The GUI may identify the out of gamut colors in a variety of ways. For example, as illustrated in FIG. 4, the processor 12 may cause the GUI to display an on screen preview image 56 of the proof with out of gamut colors outlined or otherwise highlighted. The out of gamut colors may all be identified at the same time or selectively, e.g., in response to user selection of a region of the preview image. For example, actual Delta E values (proof color vs. expected print color) may be calculated and displayed to the user as the cursor 58 is moved across the preview image 56. The GUI 16 may display the determined Delta E value for the sampled spot of the proof which is closest to the current cursor position, e.g., in a window 54 next to the preview 56. As will be appreciated, the out of gamut colors may alternatively be identified by to the user by negative inference, i.e., by identifying those colors which are within gamut.

The GUI 16 may be configured for identifying to the user all of the detected out of gamut colors. Or, the GUI may identify all out of gamut colors which meet certain criteria, such as those colors having a threshold Delta E value and/or where a region which is out of gamut meets a threshold size (this would allow regions of insignificant size that are out of gamut to be ignored).

At step S120, different emulation modes 38 of the selected printer may be displayed, e.g., in window 54. The user can also toggle between the various emulation modes within the GUI to see the effect those DFE controls have on the preview's color gamut. At S122, a preview 56 of the image, which identifies the out of gamut colors for the particular emulation mode selected, may be displayed on the GUI.

In identifying a region which is out of gamut for an output profile or selected emulation mode, the exemplary GUI displays a preview 56 of the image 20, identifying colors which are out of gamut, e.g., by highlighting them and/or through an on screen or audible alarm, e.g., in window 54. The highlighting may consist of changing the color of an out of gamut region, outlining an out of gamut region, rapidly alternating the color of the out of gamut region between two contrasting colors, adding a texture to the out of gamut region, such as cross hatching, adding textual information (e.g., the words "out of gamut") which identifies an out of gamut region, or other highlighting technique which allows the out of gamut region to be visually identified by the user.

Using this method, it may be determined that some emulation modes greatly reduce the amount of out of gamut colors, while others may substantially increase them. In one embodiment, an estimate of the out of gamut colors is obtained by comparing the measured L*a*b* values needed to reproduce the proof with the L*a*b* values that are possible on the known output device as influenced by the possible gamut of the selected emulation mode's source profile. For example, colors which fall outside the intersection of the source profile and output profile and/or which have a Delta E value which exceeds a threshold value (e.g., 0 or some finite value) may be identified as being out of gamut. This information may be displayed on the GUI, e.g., in a window 56 (S124).

In one embodiment, the processor 12 may compute a total gamut volume metric. This number represents a volumetric measure of the proofs colors which can be attained by the output device in the emulation mode selected. Various methods exist for determining the total gamut volume (sometimes referred to as Delta $E^3$). See, for example, Digital Color Imaging Handbook (Electrical Engineering & Applied Signal Processing Series), Gaurav Sharma, Editor, CRC Press, 2002; and www.gamutvision.com/docs/gamutvision_equations.html. Such methods may be adapted to provide an estimate of the total gamut volume metric as the amount (e.g., proportion or volume) of the colors within the particular hardcopy proof which are attainable (e.g., by ignoring colors which are not detected in the proof). In this way, the total gamut volume metric is expressed as a function of the detected colors in the proof, the output profile of the selected output device, and optionally also the selected source profile. The metric information may be displayed on the GUI, e.g., in a window.

Alternatively or additionally, at S126, the processor 12 may recommend an emulation mode to use, based on the smallest amount of out of gamut colors (e.g., as determined by a suitable out of gamut volume metric). The recommended CMYK emulation mode may be based on the highest total gamut volume number. Where more than one printer 14 is available, the processor may recommend a printer which achieves the smallest amount of out of gamut colors.

At S130, a copy of the proof may be printed on the selected printer. This may entail scanning the proof with a scanning device, such as the printer's own scanner, and rendering the print in the normal way with the selected emulation mode. The method ends at S132.

The computer implemented steps of the method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for visualizing out of gamut regions of a hardcopy proof.

The exemplary user interface 16 provides a convenient tool for the user by automatically measuring all the colors of a hard copy proof and showing the user out of gamut colors for a given device. Taking into account the CMYK emulation mode used on a DFE can produce a more accurate gamut approximation than simply relying on the output profile as the out of gamut metric.

The exemplary embodiment improves productivity for the customer by reducing time to press and proofing iterations. Additionally, the user is in a better starting position to achieve a match of the hardcopy proof because a gamut evaluation has been performed. Once the first print is made, an evaluation can be made of how closely the print matches to the proof. If important colors, which are known to be in gamut, are not achieved, it can be readily determined that the reproduction of that color should be possible by modification to the printer's TRC's.

By showing the out of gamut colors to the customer, the method allows the customer to know whether certain colors are not reproducible. The customer can evaluate whether to proceed with printing and is better informed as to why a match is not achieved.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for representing out of gamut colors in an original printed image for an output device comprising:
    sampling the original printed image to identify colors for the original image;
    comparing the identified colors of the sampled original printed image with an output profile of an output device to identify out of gamut colors for the output device;
    identifying, from a plurality of emulation modes available to the output device, an emulation mode which minimizes a metric of the out of gamut colors; and
    displaying a preview of the original printed image in which out of gamut colors for the output device are identified.

2. The method of claim 1, wherein the sampling of the original printed image includes scanning the original printed image with an optical sensor.

3. The method of claim 1, wherein the out of gamut colors are identified by highlighting the out of gamut colors in the preview image.

4. The method of claim 1, wherein the out of gamut colors are identified in the form of information displayed on a user interface which displays the preview image.

5. The method of claim 1, wherein the comparing the identified colors of the sampled original printed image with the output profile includes, for each of a plurality of the out of gamut colors, determining an extent to which the color is out of gamut.

6. The method of claim 5, further comprising displaying the extent which the color is out of gamut on a user interface which displays the preview.

7. The method of claim 1, wherein the metric comprises a volume of the colors of the original image which are attainable with the output device.

8. The method of claim 7, wherein the metric is expressed as a function of the detected colors in the original image, a source profile of the emulation mode, and the output profile.

9. The method of claim 1, wherein the displaying of the preview of the original printed image includes displaying a preview of the original printed image in which out of gamut colors for the emulation mode on the output device are identified.

10. The method of claim 1, further comprising storing an output profile for at least one output device.

11. A computer product comprising a tangible computer-readable recording medium on which a control program is recorded which when executed by a processor, performs the method of claim 1.

12. The method for representing out of gamut colors in an original printed image for an output device comprising:
    sampling the original printed image to identify colors for the original image;
    comparing the identified colors of the sampled original printed image with an output profile of an output device to identify out of gamut colors for the output device; and
    displaying a preview of the original printed image in which out of gamut colors for the output device are identified in response to a user moving a cursor over the preview image.

13. The method of claim 12, further comprising, identifying, from a plurality of emulation modes available to the output device, an emulation mode which minimizes a metric of the out of gamut colors.

14. A computer product comprising a tangible computer-readable recording medium on which a control program is recorded which when executed by a processor, performs the method of claim 12.

15. A method for representing out of gamut colors in an original printed image for an output device comprising:
    sampling the original printed image to identify colors for the original image;
    comparing the identified colors of the sampled original printed image with an output profile of the output device to identify out of gamut colors for the output device, including comparing the identified colors with colors in selected emulation mode to identify out of gamut colors for the output device in that emulation mode; and
    displaying a preview of the original printed image in which out of gamut colors for the output device are identified.

16. A computer product comprising a tangible computer-readable recording medium on which a control program is recorded which when executed by a processor, performs the method of claim 15.

17. A user interface for an application program including a color monitor, which displays a preview of an original hardcopy document, and a user input device for moving a cursor, the user interface identifying colors of the original document which are out of gamut for a selected output device, including highlighting out of gamut colors in response to movement of the cursor across the preview.

18. The user interface of claim 17, wherein the user interface highlights out of gamut colors on a display.

19. The user interface of claim 17, wherein the user interface displays a metric of the amount of colors in the original hardcopy document which are out of gamut.

20. The user interface of claim 17, wherein the preview comprises image data acquired by scanning the original document, the out of gamut colors being determined by comparing the image data with an output profile for the selected output device.

21. A printing system comprising the user interface of claim 17 and at least one printer for rendering a copy of the original hardcopy document on print media, the at least one printer constituting the output device.

22. A system comprising:
    an optical sensor which samples an original printed image to identify colors for the original image;
    an image processor which compares the identified colors of the sampled original image with an output profile of an output device to identify colors of the original image which are out of gamut colors for the output device, including comparing the identified colors with colors in a selected emulation mode to identify out of gamut colors for the output device in that emulation mode; and
    a user interface which displays a preview of the original printed image in which the out of gamut colors for the output device in the selected emulation mode are identified.

* * * * *